United States Patent
Burns

(10) Patent No.: US 7,676,992 B2
(45) Date of Patent: Mar. 16, 2010

(54) WALL MOUNTABLE FRAME STRUCTURE FOR MOUNTING EQUIPMENT

(75) Inventor: Don R. Burns, Tustin, CA (US)

(73) Assignee: Vantage Point Products Corp., Santa Fe Springs, CA (US)

( * ) Notice: Subject to any disclaimer, the term of this patent is extended or adjusted under 35 U.S.C. 154(b) by 0 days.

(21) Appl. No.: 11/756,560

(22) Filed: May 31, 2007

(65) Prior Publication Data

US 2007/0277449 A1 Dec. 6, 2007

Related U.S. Application Data

(60) Provisional application No. 60/810,541, filed on Jun. 1, 2006.

(51) Int. Cl.
*E04B 2/74* (2006.01)
(52) U.S. Cl. .............................. 52/36.6; 52/35; 52/571; 52/481.2; 52/489.2
(58) Field of Classification Search .................. 52/239, 52/36.4, 36.5, 36.6, 270, 571, 220.6, 220.8, 52/461, 481.2, 489.2, 463, 242; 248/243; 211/90.02
See application file for complete search history.

(56) References Cited

U.S. PATENT DOCUMENTS

| | | | |
|---|---|---|---|
| 2,260,178 A | | 10/1941 | Guignon Jr. |
| 3,234,702 A | * | 2/1966 | Zibell ...................... 52/506.05 |
| 3,305,981 A | * | 2/1967 | Biggs et al. .................. 52/36.6 |
| 3,394,507 A | | 7/1968 | Doke |
| 3,462,892 A | | 8/1969 | Meyer |
| 3,555,746 A | | 1/1971 | Geleziunas |
| 3,721,050 A | | 3/1973 | Perina |
| 4,205,815 A | * | 6/1980 | Sauer et al. ................. 248/243 |
| 4,631,881 A | | 12/1986 | Charman |

(Continued)

FOREIGN PATENT DOCUMENTS

JP 3-63342 3/1991

OTHER PUBLICATIONS

PCT Search Report PC Sep. 29, 2008.

*Primary Examiner*—Richard E Chilcot, Jr.
*Assistant Examiner*—Chi Q Nguyen
(74) *Attorney, Agent, or Firm*—Foley & Lardner LLP

(57) ABSTRACT

A wall mountable frame structure for supporting appliances, entertainment equipment or other devices including peripheral horizontal and vertical structural beams with at least one intermediate vertical beam extending between and secured to the horizontal beams. A plurality of cladding panels removably attached to the vertical beams by way of a stud having a trapping member at its terminus which fits within a complimentary receiving portion of the vertical beams to secure the cladding panel to the vertical beams. A support bracket to be affixed to a wall and having mounting forks pivotally secured thereto is provided. A plurality of transverse mounting members are affixed to the vertical beams and are received by the mounting forks to secure the frame to a wall. The mounting forks are rotatable between first and second positions with the frame positioned away from the wall in the first position and against the wall in the second position. Each of the vertical beams defines a channel within which there is received a moveable fastener which is utilized to attach one or more pieces of equipment to the frame structure. The movable fastener frictionally engages the side walls of the channel to hold the fastener in position once it is adjusted to a desired location.

22 Claims, 18 Drawing Sheets

U.S. PATENT DOCUMENTS

| | | | |
|---|---|---|---|
| 4,884,702 A * | 12/1989 | Rekow | 211/90.02 |
| 5,014,479 A | 5/1991 | Yeh et al. | |
| 5,177,917 A | 1/1993 | Del Castillo Von Haucke | |
| 5,209,035 A | 5/1993 | Hodges et al. | |
| 5,214,890 A | 6/1993 | Levitan et al. | |
| 5,321,579 A | 6/1994 | Brown et al. | |
| 5,352,033 A | 10/1994 | Gresham et al. | |
| 5,400,560 A | 3/1995 | Hellwig et al. | |
| 5,694,727 A | 12/1997 | Dobija | |
| 5,809,715 A | 9/1998 | Tanaka | |
| 5,845,440 A | 12/1998 | Matsuyama et al. | |
| 5,974,753 A | 11/1999 | Hsu | |
| 6,088,981 A | 7/2000 | Edwards | |
| 6,134,852 A | 10/2000 | Shipman et al. | |
| 6,167,664 B1 | 1/2001 | Reuter et al. | |
| 6,230,445 B1 | 5/2001 | Arko et al. | |
| 6,250,029 B1 | 6/2001 | Jeffers et al. | |
| 6,330,773 B1 * | 12/2001 | MacDonald et al. | 52/239 |
| 6,363,663 B1 * | 4/2002 | Kane et al. | 52/36.6 |
| 6,367,213 B1 | 4/2002 | Reuter et al. | |
| 6,612,077 B2 | 9/2003 | Parshad | |
| 6,658,805 B1 | 12/2003 | Yu et al. | |
| 6,735,908 B2 | 5/2004 | Edwards | |
| 6,748,710 B2 * | 6/2004 | Gresham et al. | 52/242 |
| 6,851,226 B2 | 2/2005 | MacGregor et al. | |
| 2002/0112411 A1 | 8/2002 | Gravel et al. | |
| 2003/0112591 A1 | 6/2003 | Zodnik | |
| 2003/0208973 A1 | 11/2003 | Corden | |
| 2003/0208978 A1 | 11/2003 | Chen | |
| 2004/0040248 A1 | 3/2004 | Vilnes | |
| 2005/0005527 A1 | 1/2005 | Metcalf et al. | |
| 2005/0028454 A1 | 2/2005 | Steed et al. | |
| 2005/0086871 A1 | 4/2005 | MacGregor et al. | |

* cited by examiner

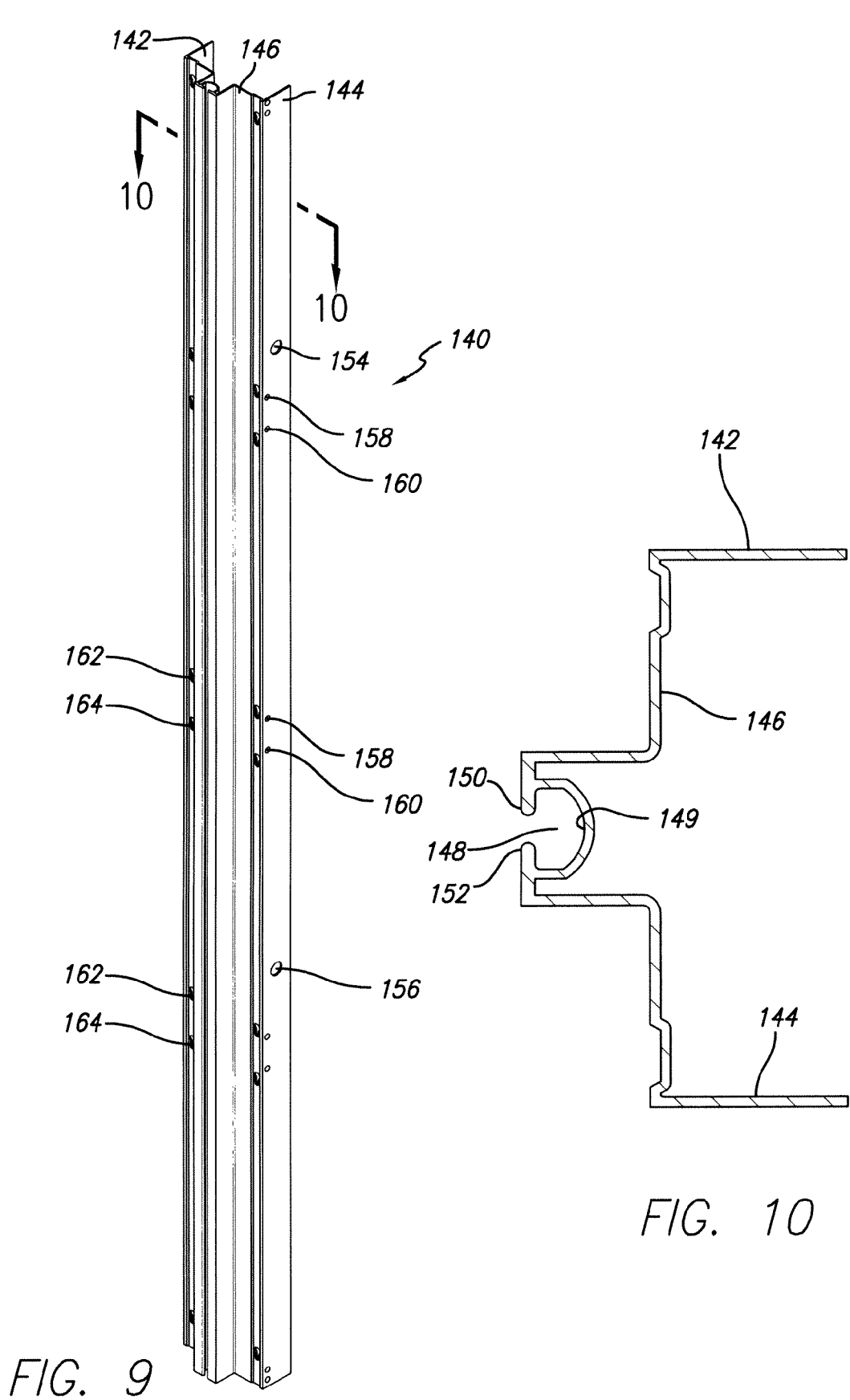

WALL MOUNTABLE FRAME STRUCTURE FOR MOUNTING EQUIPMENT

RELATED APPLICATION

This application is based on provisional application 60/810,541 filed Jun. 1, 2006, and benefit of the filing data thereof is hereby claimed.

FIELD OF THE INVENTION

The field of the invention is an apparatus for mounting equipment of many types in the office, industrial or home environments.

BACKGROUND OF THE INVENTION

The present invention relates to an apparatus for mounting appliances or equipment of many types in offices, industrial areas or homes and is particularly useful for mounting home entertainment devices such as a television set, speakers, CD/DVD players and the like and more particularly, to a frame structure which is adapted to be mounted upon a wall and to which such home entertainment devices may be affixed.

It has become recognized in the industry, particularly as a result of the development of flat panel television sets that means to mount such devices to the wall of a structure have become extremely important. Many such mounting systems are extremely complicated and difficult to install and often require an electrician or cabinet maker to accomplish this task. Even when such is accomplished, a remaining problem is that the wiring and cabling necessary to operate the various devices remains visible and is unsightly.

There are numerous prior art patents which disclose partition paneling for utilization in dividing up space within commercial buildings into appropriate office space for use by tenants. Many of the disclosed partitions include attachment locations which define mounting spaces to which various types of equipment may be secured. Typical of such prior art structures are those disclosed in U.S. Pat. Nos. 6,851,226; 5,321,579; 5,400,560; 6,167,664; 5,694,727; and published application No. U.S. 2005/00086871. Also in the prior art there is disclosed stand alone mounting arrangements or arrangements which may be attached to a wall such as those shown in U.S. Pat. Nos. 3,462,892 and 6,612,077. The structures as disclosed in the prior art are either designed for permanent installation into a structure to define designated areas for utilization as an office or alternatively, are used to provide a display board or to adapt a hospital room wall to provide more convenient access to service outlets needed in a hospital room. U.S. Pat. No. 5,694,727 discloses a system in which there is provided a panel wall consisting of an array of individual panels in which the panels are accurately positioned in both vertical and horizontal direction. This system is designed to provide a finished wall as opposed to a partitioning wall or a standalone wall for accommodating various objects.

A need exists for a structure that may be independently attachable to an existing wall structure which is capable of having various devices of the type described in the above referred to prior art as well as components of a home entertainment system attached thereto in such a manner that the various tubes, wires, and cabling are concealed and which provides an effective and efficient assembly for such purpose and at the same time is pleasing in appearance.

SUMMARY OF THE INVENTION

A wall mountable frame structure for mounting equipment comprising a frame having vertical and horizontal spaced apart beam members, a plurality of cladding panels detachably secured to said beam members and spaced therefrom, a plurality of support brackets adapted for attachment to a wall, a plurality of transverse mounting members adapted for engagement with said support brackets to support said frame on said support brackets.

BRIEF DESCRIPTION OF THE DRAWINGS

FIG. 9 is a perspective view of a vertical structural beam member which is adapted to be disposed between the side edges of the frame structure;

FIG. 10 is a cross-sectional view of the member illustrated in FIG. 9 taken about the lines 10-10 thereof;

DETAILED DESCRIPTION

The present invention is a modular or non-modular wall mountable frame system which is adapted to be attached directly to a wall or to hang from mounting brackets or rails which are installed directly to the wall. The frame structure encompasses an area large enough to provide for numerous attachment points to the wall such that the load carried by the frame is distributed through these various attachment points. The frame has a plurality of attachment points on its exterior face where any assortment of equipment including entertainment equipment or similar devices may be attached through the utilization of any of a variety of mounting structures. The frame system is adapted to detachably receive a plurality of cladding panels which creates a hollow space between the cladding panels and the wall upon which the frame has been installed. The dead air space provides a sound barrier and prevents sound emanating from entertainment speakers from traveling into adjacent rooms. This proves to be a very effective and desirous result when the present invention is used in hotel, motel or office complexes where high density occupancy occurs. Each individual cladding panel defines a peripheral space between it and the frame through which tubing, wiring, cabling and the like can pass from the exterior of the frame into the hollow space between the cladding panels and the wall. The cladding panel members are detachably secured to the frame system in such a manner that the cladding panels may be easily attached or alternatively detached to allow access to the concealed tubing, wiring, cabling, connections and the like. The cladding panels may be constructed of any material desired depending upon the particular decorative ambiance utilized at the venue where the mountable frame structure is being installed.

Figure 1:
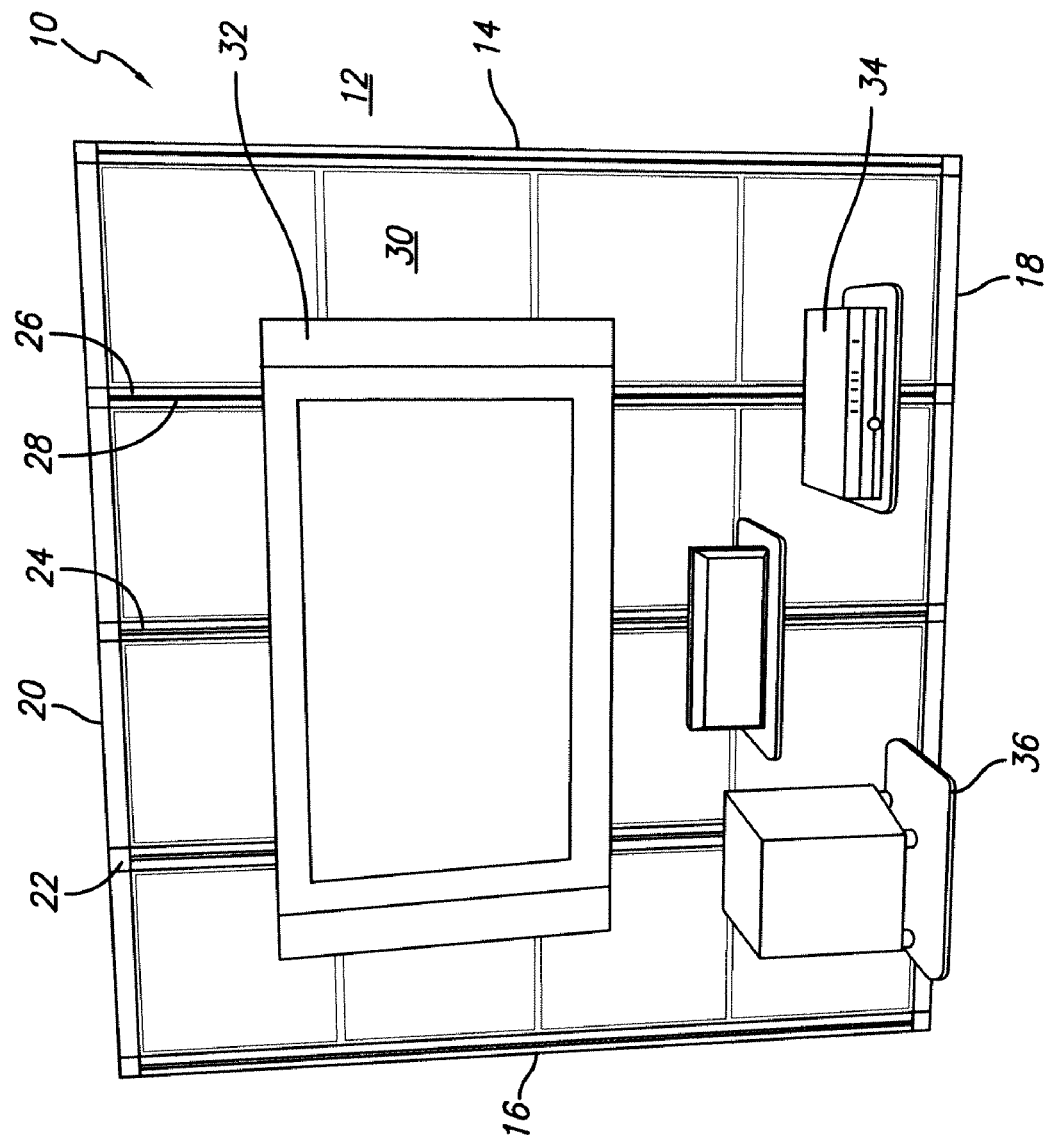
FIG. 1 illustrates the wall mountable structure in place on a wall with various items of a home entertainment center affixed thereto.

Referring now more particularly to FIG. 1, there is illustrated a mounting frame structure 10 constructed in accordance with the principles of the present invention mounted upon a wall 12. The frame structure includes a peripheral or edge structural beam member which is disposed both vertically and horizontally with the vertical portions shown at 14 and 16 and the horizontal portions shown at 18 and 20. Center or intermediate structural beam members are shown at 22, 24 and 26 and are connected to the horizontal members 18 and 20. Each of center members as well as the vertically disposed peripheral members 14 and 16 include a channel as shown at 28 on member 26 which is adapted to receive an appropriate connecting member, as will be described more in detail below, for use in attaching the various components to the wall mounted frame structure 10. As is illustrated in FIG. 1, a plurality of cladding panels such as shown at 30 are secured to the peripheral and/or central structural beam members. As is illustrated in FIG. 1 there are 16 such cladding panels and as will be described and illustrated more in detail below, each of the panels is independently detachable from the frame structure as may be desired to access the space between the cladding panels and the wall 12. Alternatively, the cladding panels may be permanently affixed to the frame structure in various groups such as 4, 9, 12, or the like, depending upon the particular application.

As is illustrated in FIG. 1, home entertainment devices such as a flat panel television 32, a CD/DVD player 34 or other similar home entertainment devices are affixed to the wall mounted frame structure 10. As is shown some of the devices may be resting upon a shelf 36 or similar such device. As indicated above, the present invention is useful for mounting a large variety of devices, however, for use of illustration and description only entertainment devices are shown and described. The shelf 36 is affixed to the channel 28 formed in the center vertical member 22 and the flat panel TV 36 is preferably attached through the channels in the vertical beam members 22, 24 and 26 by utilization of a flat panel display mounting structure of any type well known in the art. As will be evident from FIG. 1 even though numerous home entertainment devices are attached to the wall mounted frame structure, no wiring, cabling or the like is visible which provides a very pleasing appearance for such a home entertainment system.

Figure 1A:
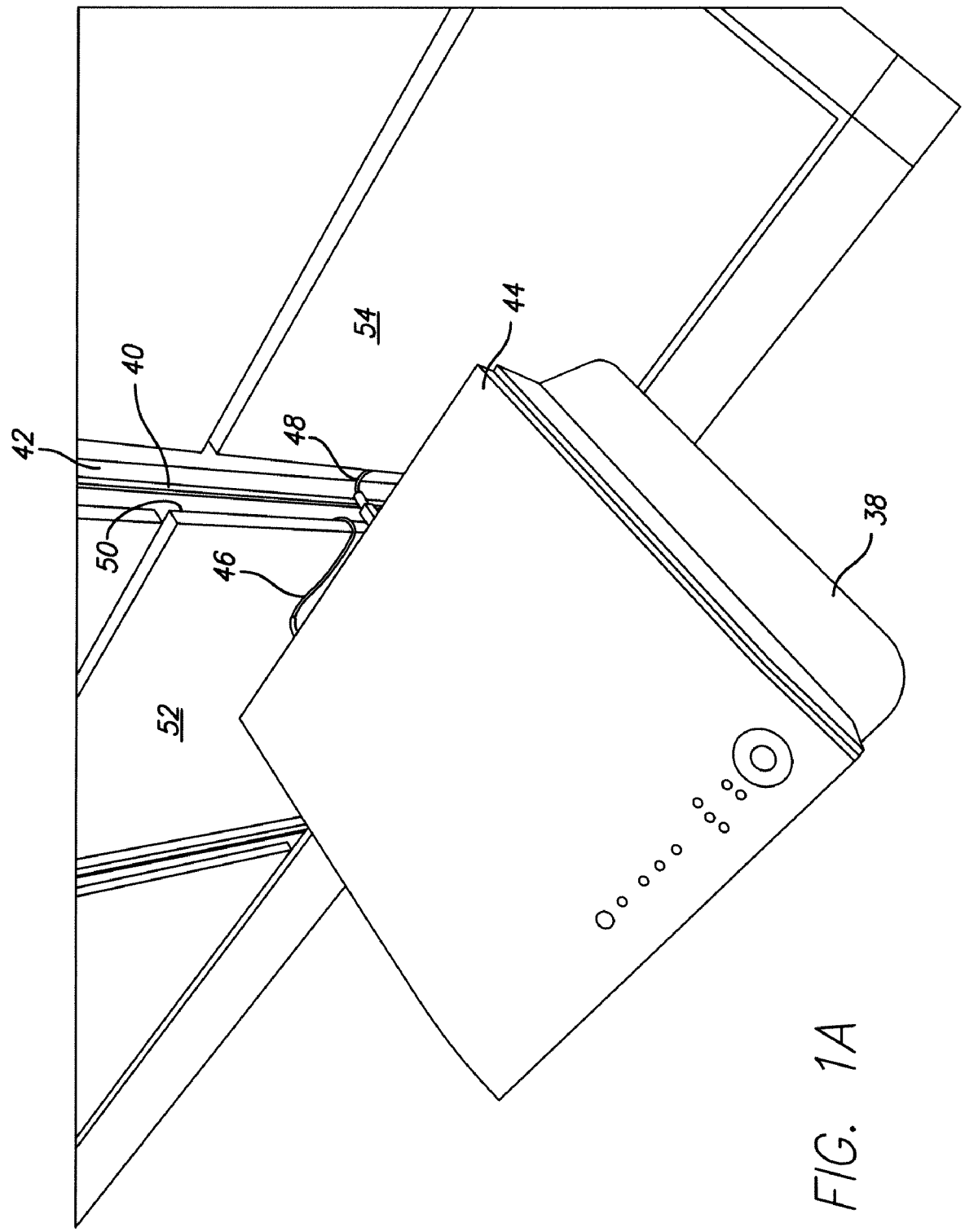
FIG. 1A is a close up illustrative of a shelf affixed to the structure and supporting a home entertainment device showing the cabling emanating therefrom and passing into the wall mountable structure.

Referring now more particularly to FIG. 1A there is illustrated a shelf 38 that has been mounted to the channel 40 in the center structural beam member 42 of the frame structure 10. A home entertainment device 44 rests upon the shelf 38 and the cabling 46, 48 passes through a peripheral space such as shown at 50 between the side and rear of the cladding panel 52 and the vertical structural beam member 42. The cabling 48 similarly passes through a similar opening behind the cladding panel 54. It can thus be seen that the wiring, cabling and the like is not visible from the exterior because it is hidden by the cladding panels 52 and 54 and allowed to pass within the space between the frame structure and the wall. As above referred to and as will be discussed more in detail below, the cabling such as that shown at 46 and 48 may be readily passed into the space by detaching the cladding panels 52 and 54 from the frame structure 10 and running the cabling into the space after its attachment to the device 44. The cladding panels 52 and 54 may then be easily reattached to the frame structure 10 to provide the appearance that is shown in FIGS. 1 and 1A.

Figure 2:
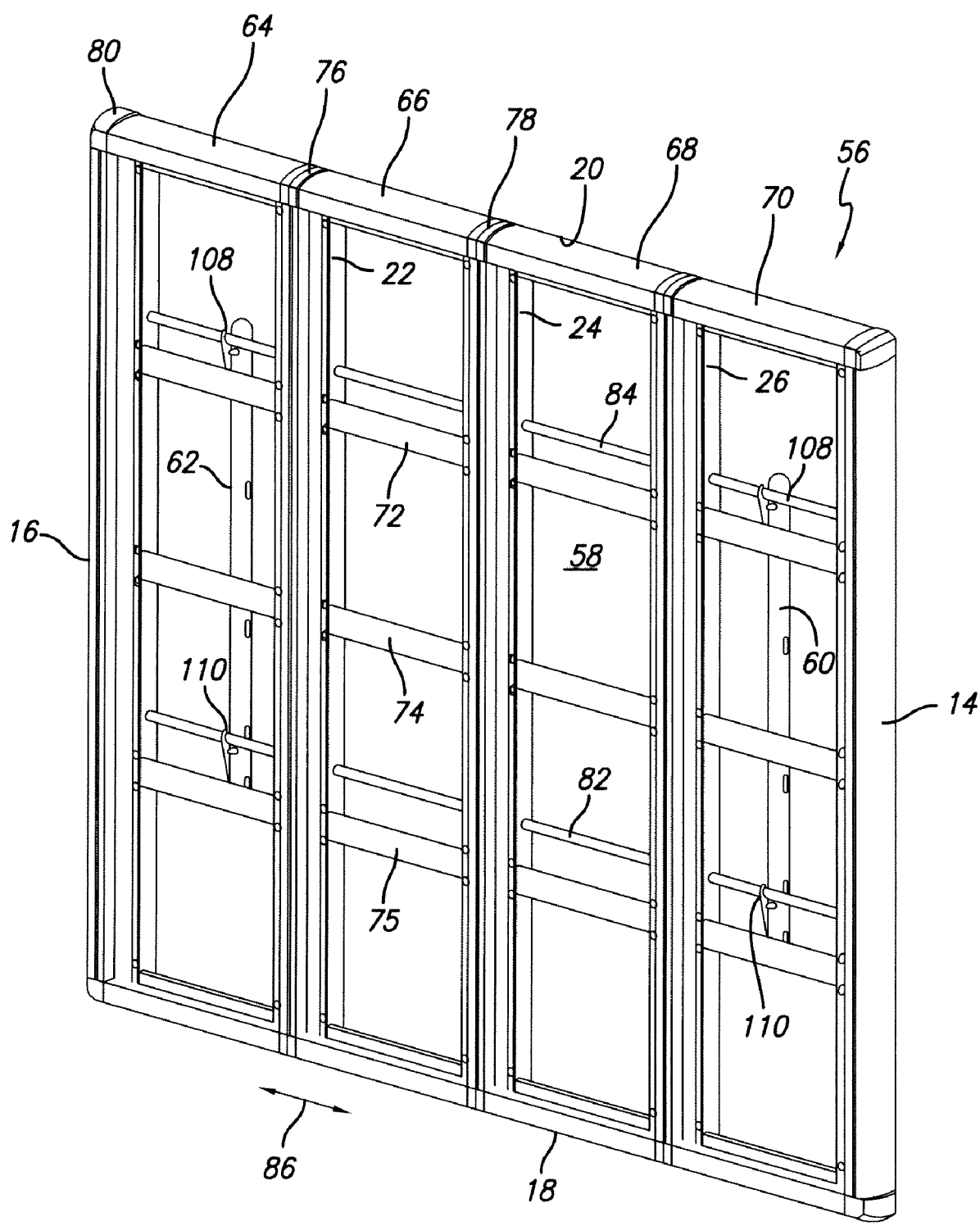
FIG. 2 is a perspective view of the frame structure in accordance with the present invention, but without the cladding.
Figure 3:
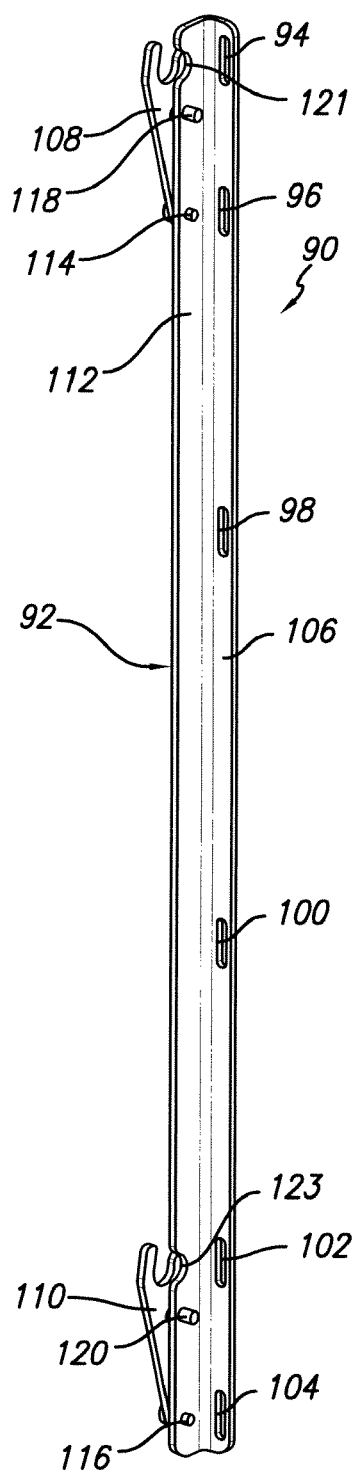
FIG. 3 is a perspective view of a support bracket used to mount the frame structure.
Figure 5:
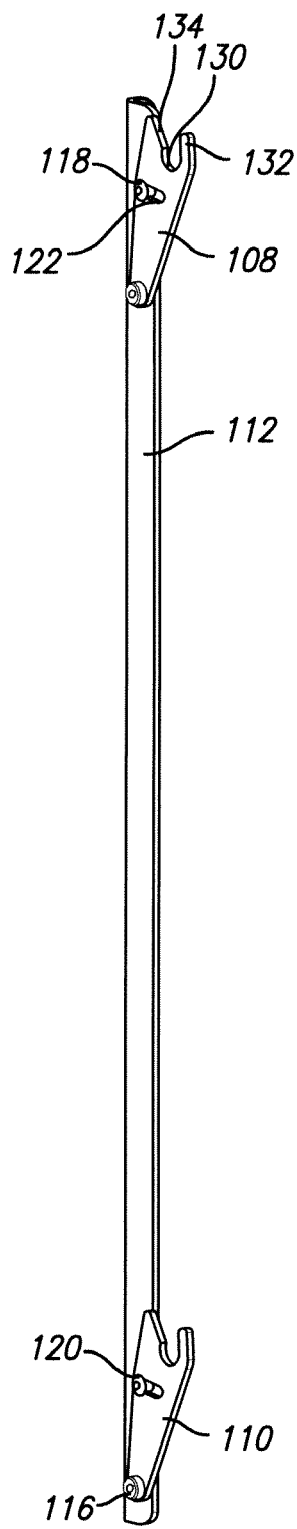
FIG. 5 is a perspective view of a support bracket as shown in FIG. 3 but from the opposite side thereof.

Referring now more particularly to FIG. 2 there is illustrated, in perspective view, the frame structure 56 without the cladding panels and being mounted upon a wall 58. A plurality of support brackets 60 and 62 are affixed to the wall 58 by any means desired. It should be understood that any number of such support brackets may be utilized depending upon the size and weight of the frame structure and the apparatus to be supported on it. It should be understood that the wall 58 may be constructed of any material desired such as wood, wallboard, masonry or the like, the only difference being the manner in which the support brackets 60 and 62 are mounted to the wall 58. As is shown in FIG. 2, the horizontal, peripheral beam members 18 and 20 are constructed utilizing modular elements such as those as shown at 64, 66, 68 and 70 of the upper horizontal member 20. The lower horizontal member 18 is constructed of similar modular elements. It will be recognized by those skilled in the art that the horizontal members may be constructed utilizing these modular elements so that there are any number of such elements as desired for a particular application. For example, a wall mountable structure may have any desired number of cladding panels, preferably such a structure would have four (4) cladding panels, nine (9) cladding panels or 16 cladding panels (as shown in FIG. 1) or any other number that is desired simply by incorporating the desired number of incremental modules as shown at 64, 66, 68 and 70. These modules are secured together to provide the desired length and such will be shown in greater detail below. A plurality of U-shaped channel beams such as shown at 72, 74 and 75 are secured between the vertical structural beam members 22, 24, 26 and the vertical peripheral beams 14 and 16 to interconnect them together to make a structurally sound frame 56. As is shown in FIG. 2 where incremental components along the horizontal peripheral members are connected together there is provided a cap or cover such as that shown at 76 and 78 to cover the interconnecting joint. A similar cap or cover 80 is provided at each of the corners to also cover where the members intersect or come together. These caps or covers also define openings to permit wiring to pass into or out of the frame.

To mount the frame structure 56 to the support brackets 62 there is provided first 82 and second 84 transverse mounting members. It should be understood that additional transverse mounting members may be utilized as required by the size and/or weight of the frame structure and the completed apparatus. The mounting members pass through openings defined by the vertical or intermediate, as well as the peripheral side structural beam members and are thus secured thereto. These transverse mounting members are attached to the support brackets 60, 62 as will be more fully described below to support the bracket 56 and the completed unit with the cladding panel thereon on the wall 58. As will become more apparent from the description to follow, once the frame 56 is placed upon the support brackets 60 and 62, it may be laterally adjusted, as shown by the arrow 86, to position it upon the wall 58 as may be desired. As will be more fully explained below, the mounting forks 108 and 110 secured to the brackets 60 and 62 toggle outwardly away from the wall 58. When in this position the frame 56 can be laterally adjusted without scratching or otherwise marring the wall. Subsequent to such desired positioning, the mounting forks are toggled backward and the frame 56 is then rigidly clamped to the support brackets 60 and 62. Once in position and adjusted properly, the various mounting devices such as the shelves, display brackets and the like may be affixed as above described to the frame, the wiring and cabling may then be disposed within the open space and thereafter the cladding panels may be attached to the frame 56. Obviously, the various devices may then be positioned and the wiring, cabling, and the like attached thereto. An important feature of the wall mountable frame of the present invention is that the space provided between the back surface of the cladding panels 30 and the wall 58 is substantially the same as the space provided in the normal wall structure for most buildings. Therefore, any in-wall mountable device may be mounted on the wall mountable frame structure.

Referring now more particularly to FIGS. 3 through 8, the support brackets 60 and 62 will be described and illustrated in greater detail. As is therein shown, the support bracket 90 includes an angle iron 92 having arms 106 and 112. The arm 106 defines a plurality of openings 94 through 104 formed therethrough. The openings 94 through 104 are adapted to receive fasteners which pass therethrough and into the wall upon which the bracket is to be installed. By having a multiplicity of openings such as shown at 94 through 104, the load which is to be borne by the mounting bracket is distributed along a number of supports and thus provides a greater distributive strength for the wall mountable frame structure. In addition, the design of the support bracket also provides greater strength to the wall 58 thus allowing a weak wall structure to support more items than could be done by the wall alone. As is illustrated, each of the openings 94 through 104 is in the form of an elongated slot thus permitting limited vertical positioning of the support bracket thus assuring proper alignment with other support brackets prior to its final affixation to the wall. Each of the support brackets 90 includes a plurality of mounting forks 108 and 110 which are pivotally attached to the arm 112 of the angle iron 92. Although only two (2) mounting forks are illustrated, any number may be used to accommodate the number of transverse mounting members used. As is illustrated at 114 and 116 also provided is a fastening member 118 and 120 to secure the mounting forks, 108 and 110 respectively, in locked position once the frame 56 has been positioned thereon. The support bracket defines an arcuate recesses 121 and 123 in the arms 112 and 106 respectively disposed adjacent the mounting forks 108 and 110.

Figure 4:
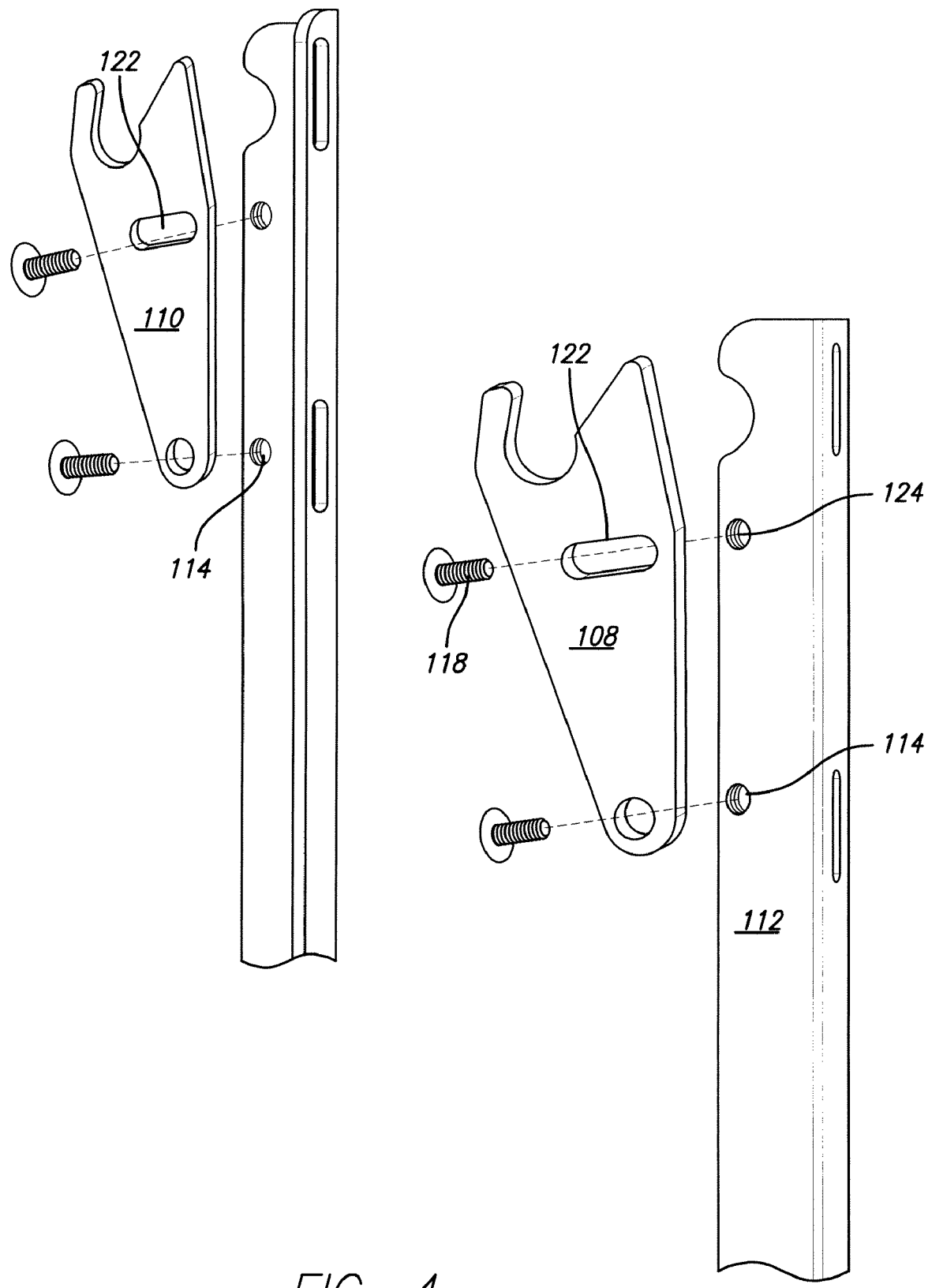
FIG. 4 is an exploded view of the components of the support bracket as shown in FIG. 3.

As is more clearly shown in FIG. 4, the mounting forks 108 and 110 each have an elongated slot 122 formed therein to allow the mounting fork to pivot about the pivot point 114 between first and second positions and thereby toggle outwardly and inwardly with respect the wall 58. When the transverse mounting member is positioned as will be fully described below, the mounting fork is pivoted clockwise toggled inwardly, as viewed in FIG. 4, so that the fastener 118, which is inserted into the threaded opening 124 may be tightened to secure the mounting fork in position to securely lock the frame into position on the wall 58.

Figure 6:
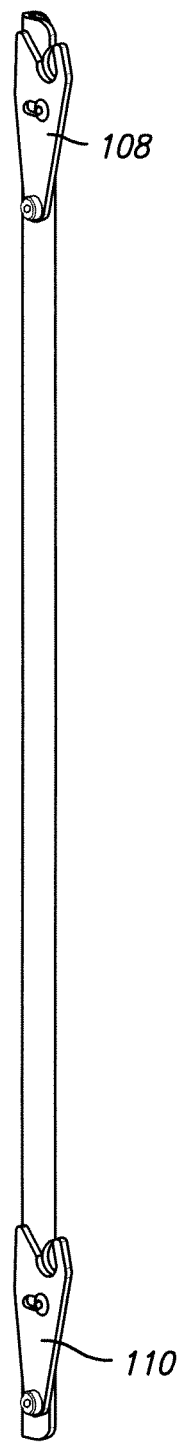
FIG. 6 is a perspective view of a support bracket as shown in FIG. 3 with the moveable arms in a locked position.

Referring now more particularly to FIG. 6, the mounting forks 108 and 110 are shown in their closed and locked positions. These positions will be utilized when the transverse mounting member is positioned on the support brackets 60 and 62.

Figure 7:
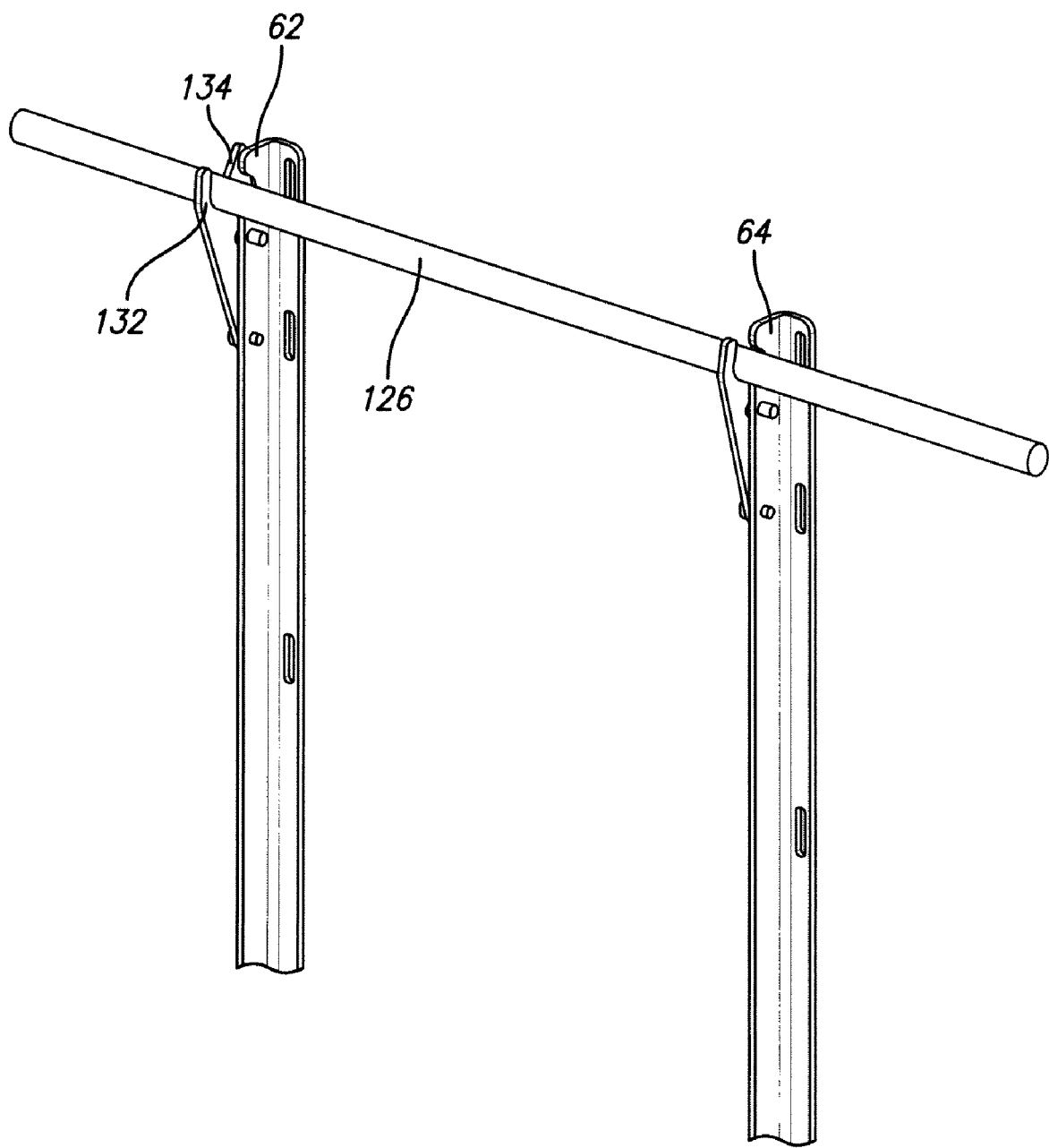
FIG. 7 illustrates a transverse mounting member in position on the support brackets but before being locked in position.
Figure 8:
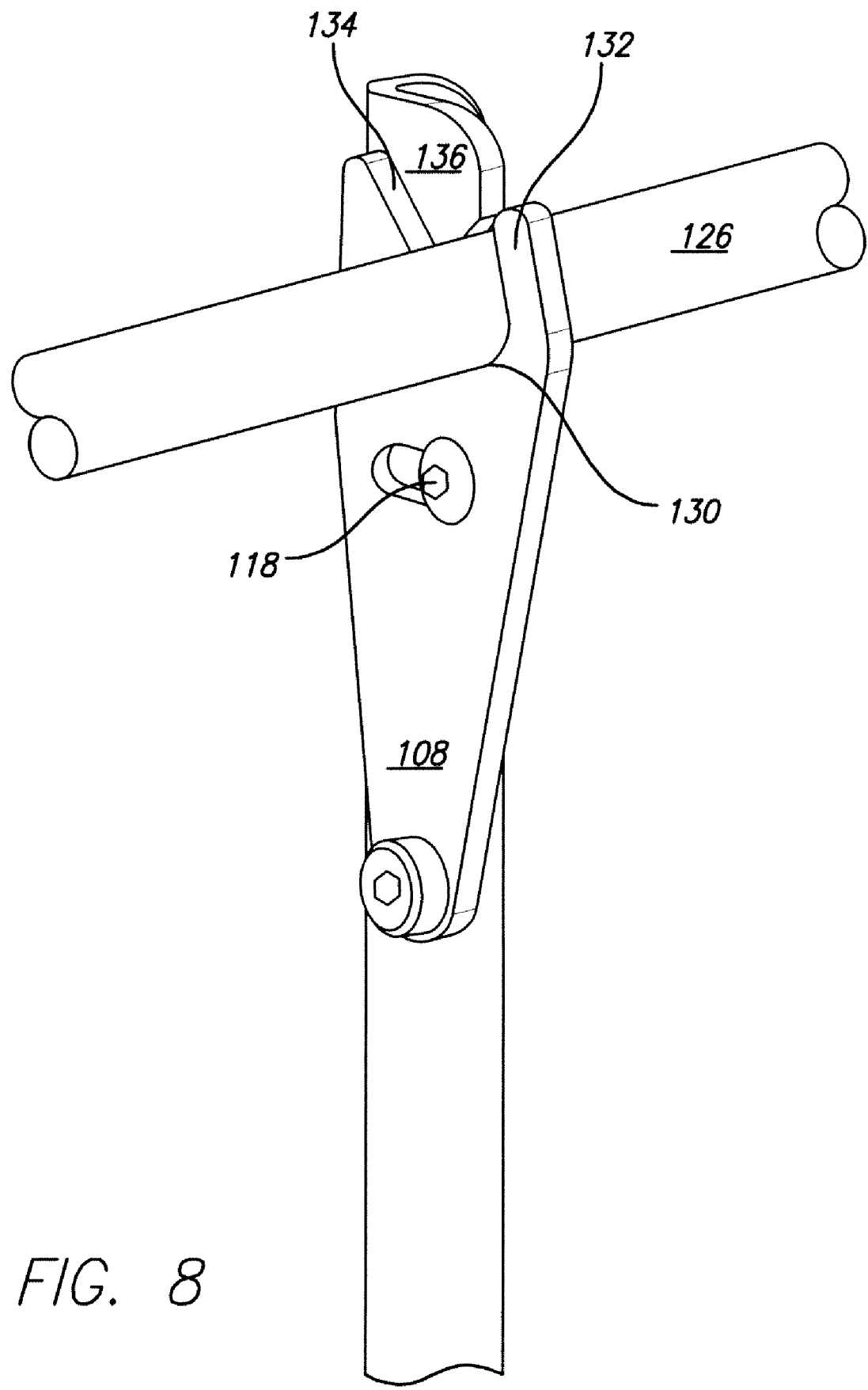
FIG. 8 illustrates the transverse mounting member locked in position on the support bracket.

Referring now more particularly to FIGS. 7 and 8, a transverse mounting member 126 is shown seated within a receiving recess 130 formed by a finger 132 and an angularly disposed or slanted surface 134. The slanted surface 134 causes the transverse member 126 to position it within the recess 121 to be easily disposed on the mounting forks and to then slide into the receiving recess 130 and to be retained in place by the finger 132. It should be noted that the finger 132 extends upwardly beyond the circumference formed by an extension of the receiving recess 130. The purpose of such construction as illustrated in FIG. 8, which shows the mounting forks rotated into locked position, is to ensure that the finger 132 totally grasps the transverse mounting member 126 and closes the opening between the end of the mounting fork and the terminus 136 of the arm 112 of the angle iron 92 so that it will be impossible, once the fastener 118 has been secured, for the transverse mounting member 126 to be removed from the mounting fork 108. This, therefore, provides a security function to prevent the frame 56 from being inadvertently removed from the support brackets 60 and 62.

Referring now more particularly to FIGS. 9 and 10 there is illustrated the construction of the center or intermediate vertically disposed structural beam members 22, 24 and 26 (FIG. 2) of the frame 56. The vertically disposed intermediate structural beam member 140 is preferably an extruded aluminum structure of a generally u-shaped form having a pair of arms 142 and 144 interconnected by a central section 146. The central section 146 provides an internal channel 148 defined by a pair of inwardly directed spaced apart fingers 150 and 152 and includes a base portion or surface 149. A similar channel is formed in each of the vertical structural beams of the peripheral structural member of the frame. The arms 142 and 144 each define openings 154 and 156 formed therein to receive the transverse mounting members 82 and 84 (FIG. 2) as shown at 126 in FIG. 8. Each of the arms also provide a plurality of openings such as shown at 158 and 160 through which fasteners pass to secure the u-shaped channel members 72, 74 and 75 (FIG. 2) which extend between the vertically disposed structural beam members whether they be intermediate or central or peripheral structures. Also provided are a plurality of additional openings in the base 146 as shown at 162 and 164. As is illustrated these openings are keyhole type openings and are used to secure the cladding panels to the frame structure, as will be more fully described below. As is indicated in FIG. 2 there may be a plurality of vertically disposed members of the central or intermediate type as shown in FIG. 9 depending upon the number of cladding panels to be utilized in a particular installation.

Figures 11, 12:
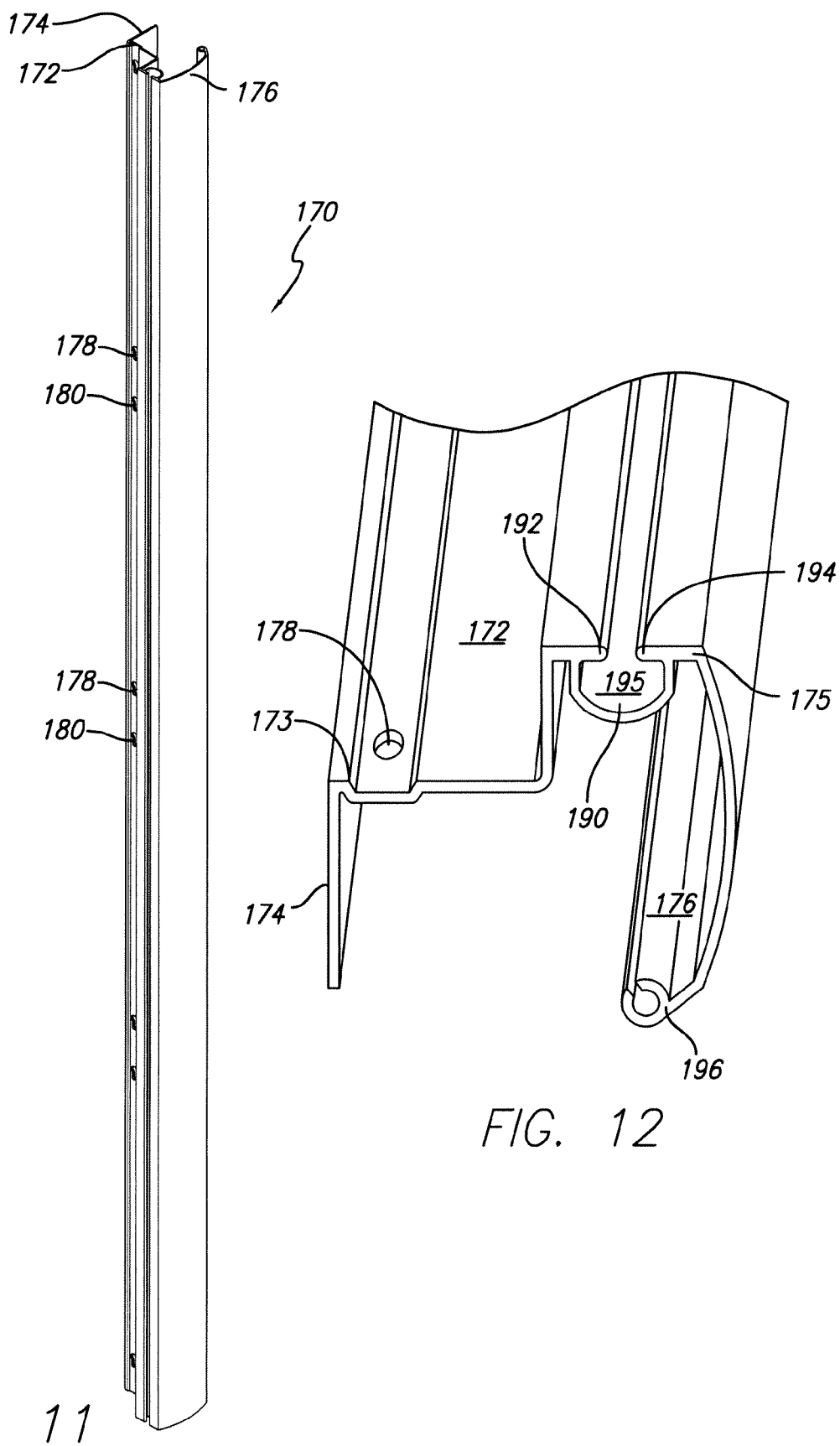
FIG. 11 is a perspective view of a vertical structural beam member utilized on the edges of the frame structure.
FIG. 12 is an end view of the structure illustrated in FIG. 11.

Referring now more particularly to FIGS. 11 and 12, there is illustrated the construction of the peripheral or edge structural beam members as shown at 14 and 16 of FIG. 2. It should also be understood that the incremental members 64, 66, 68 and 70 as shown in FIG. 2 would have a similar construction to that shown in FIG. 11 but in smaller sections and would not include the keyhole openings described below. The peripheral or edge member 170 is preferably an extruded aluminum member including a base 172 having a first edge 173 and second edge 175. The first edge 173 has a straight arm 174 extending therefrom and the second edge 175 has a curved arm 176 extending therefrom. The base 172 has a plurality of openings 178, 180 which are disposed therealong for the purpose of receiving the fasteners for the cladding panels as will be described more fully below. The base 172 also defines a channel 190 defined by a pair of inwardly directed spaced apart fingers 192 and 194 and a base surface 195 similar to that described above with regard to the vertical center or intermediate beam members. It is important to note that the downwardly extending curved arm 176 is formed to have an inwardly slanted terminal portion 196 thereof. This structural design is important in that it extends around the entire periphery of the wall mountable frame structure 10 and when it is in place on the wall precludes visual perception by the observers of any irregularities which may occur in the wall upon which the structure is mounted.

Figure 13:
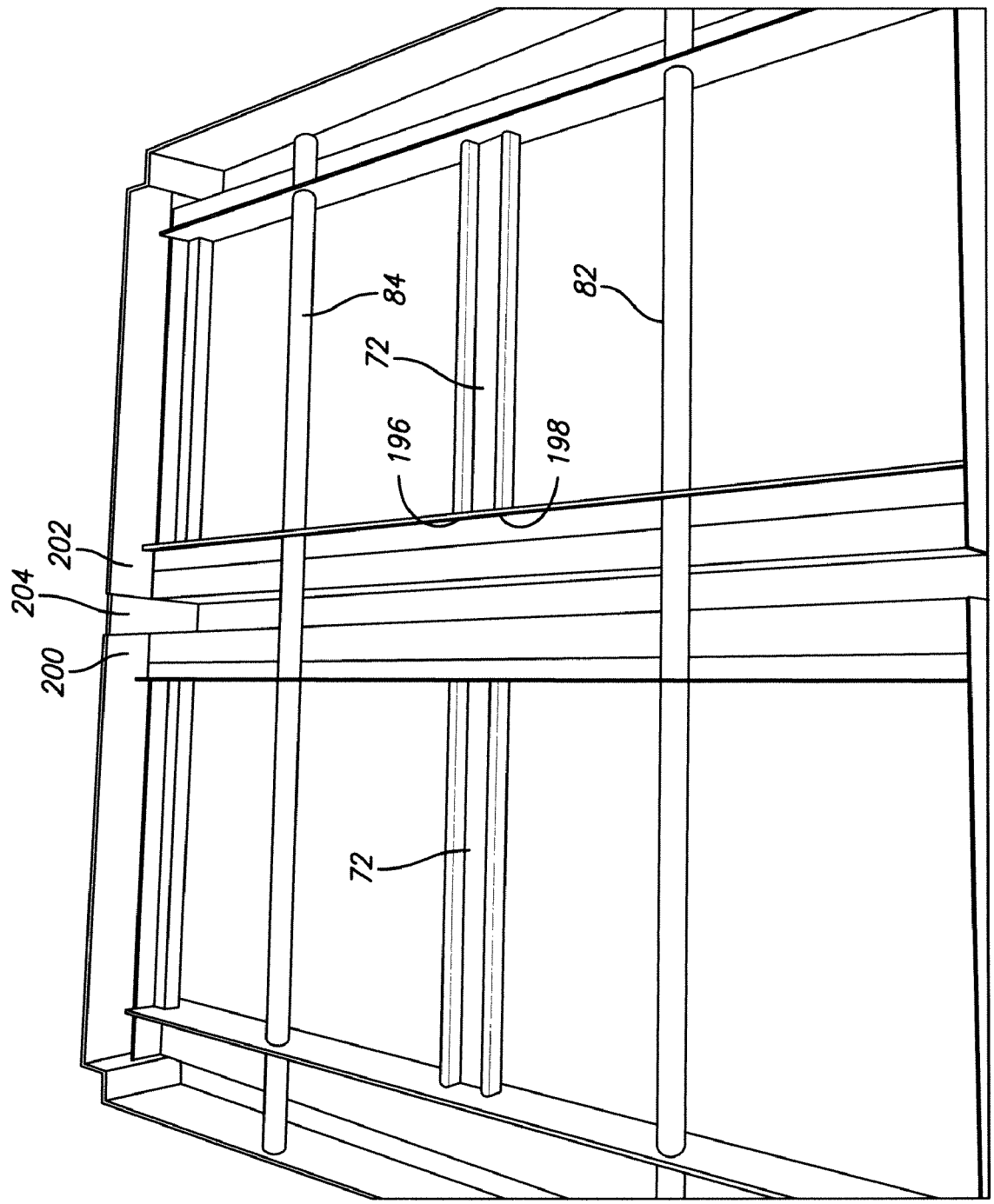
FIG. 13 is a perspective view of a frame structure having four panels and illustrative of the manner in which the transverse mounting members are disposed.

By referring now more particularly to FIG. 13, the frame 56 as illustrated in FIG. 2 is shown from the rear with appropriate unshaped channels 72 connected by fasteners 196, 198 to the downwardly depending arm of a central vertical beam member as above described. The transverse mounting members 82 and 84 are illustrated passing through the arms of the peripheral and vertical centrally disposed beam members. It would also be recognized by those skilled in the art that the sectional components 200 and 202 are illustrated in their partially assembled fashion with a connector 204 holding the same together but with a space there between. Reference is also made back to FIG. 2 for a clear and more thorough understanding of the structure illustrated in FIG. 13.

Figure 14:
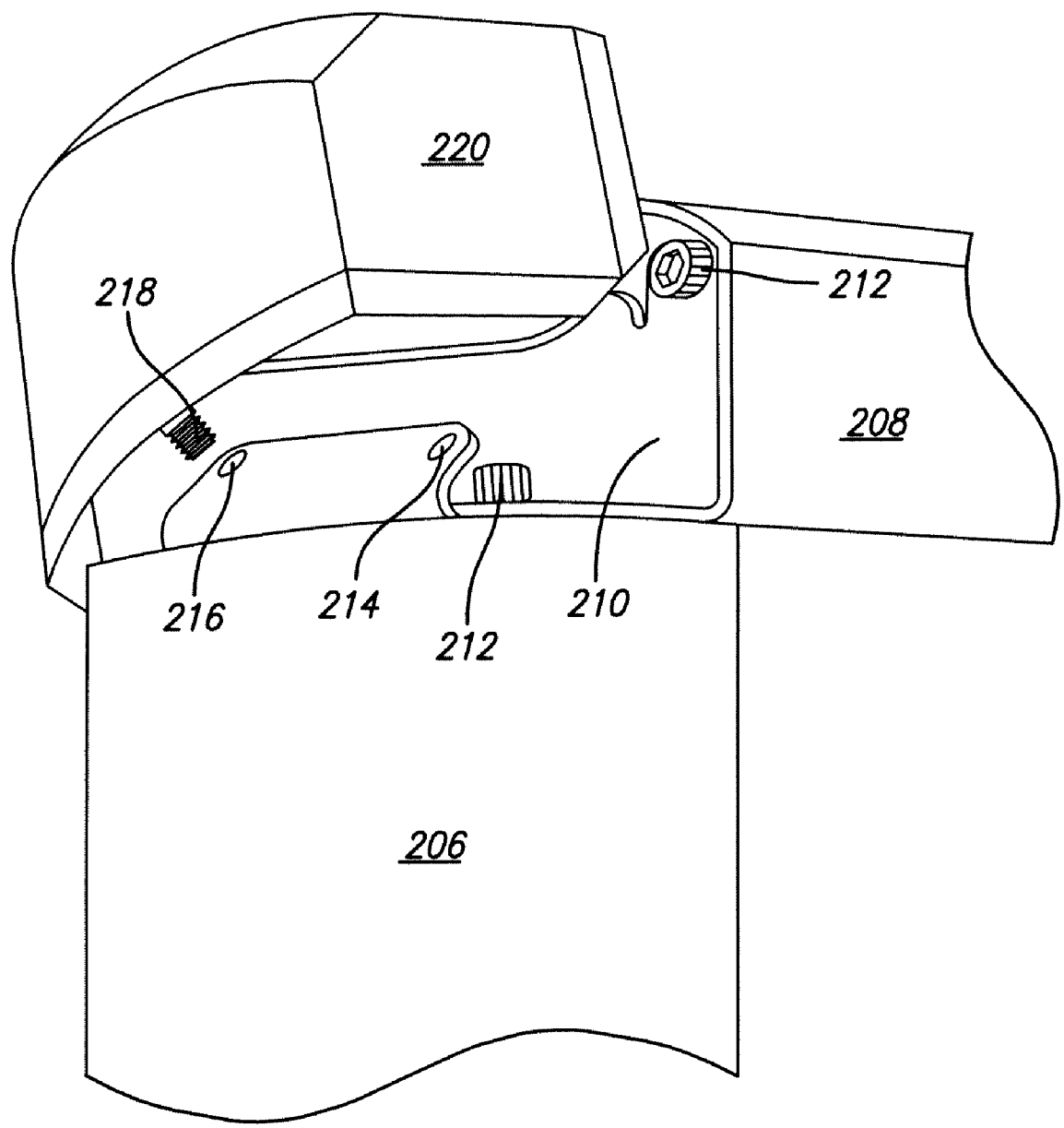
FIG. 14 illustrates the manner in which the corners of the side edges of the frame come together.
Figure 15:
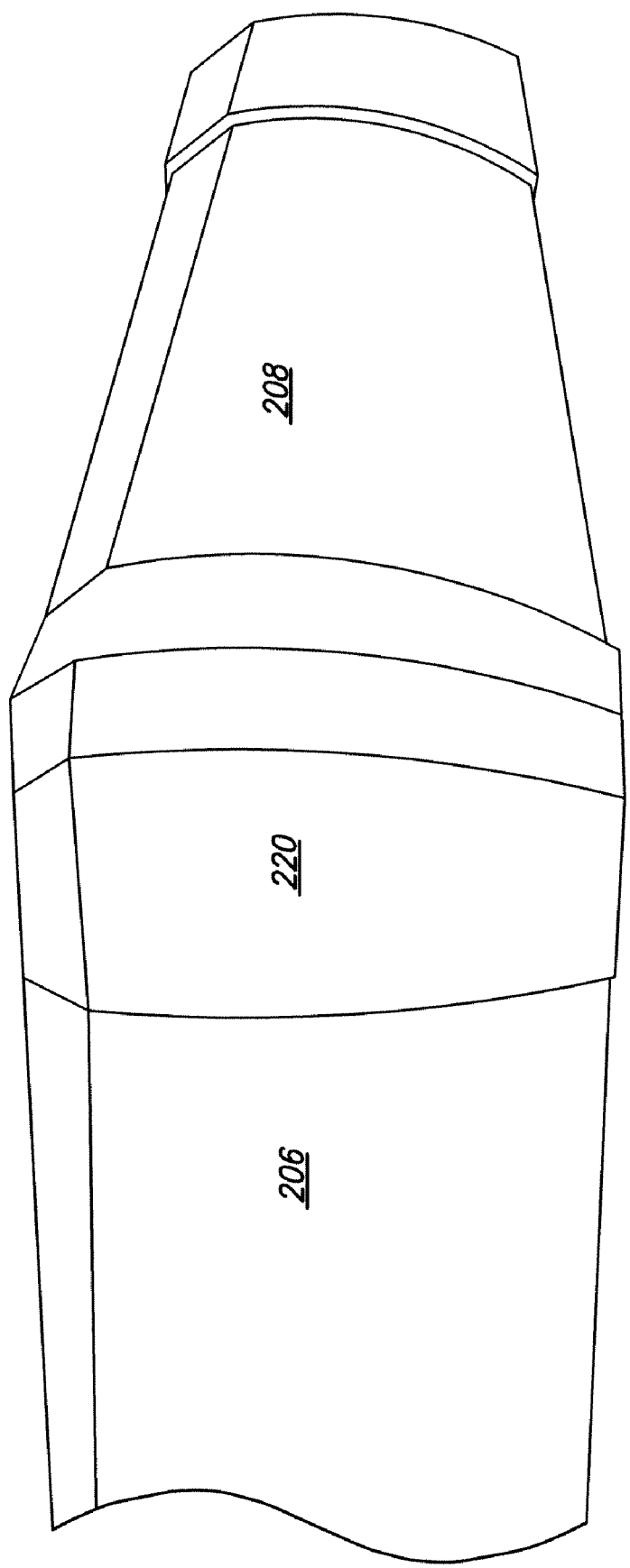
FIG. 15 illustrates the manner in which the corner of the side edges is covered for final assembly.

FIG. 14 illustrates a corner joint of the frame as is shown in FIG. 2. As will be clearly recognized by those skilled in the art, a vertical 206 and horizontal 208 peripheral beam member is brought together at a corner position thereof. A securing adapter 210 is fastened utilizing screws 212 or the like to each of the vertical and horizontal members 206 and 208. The adapter defines a plurality of openings such as shown at 214 and 216. These openings are designed to receive a molded plastic fastener 218 formed as an integral part of the molded plastic corner cover 220 to secure the same in place. The completed assembly is shown in FIG. 15 with the cover 220 secured in place on the vertical and horizontal members 206 and 208 to provide the finished appearance.

Figure 16:
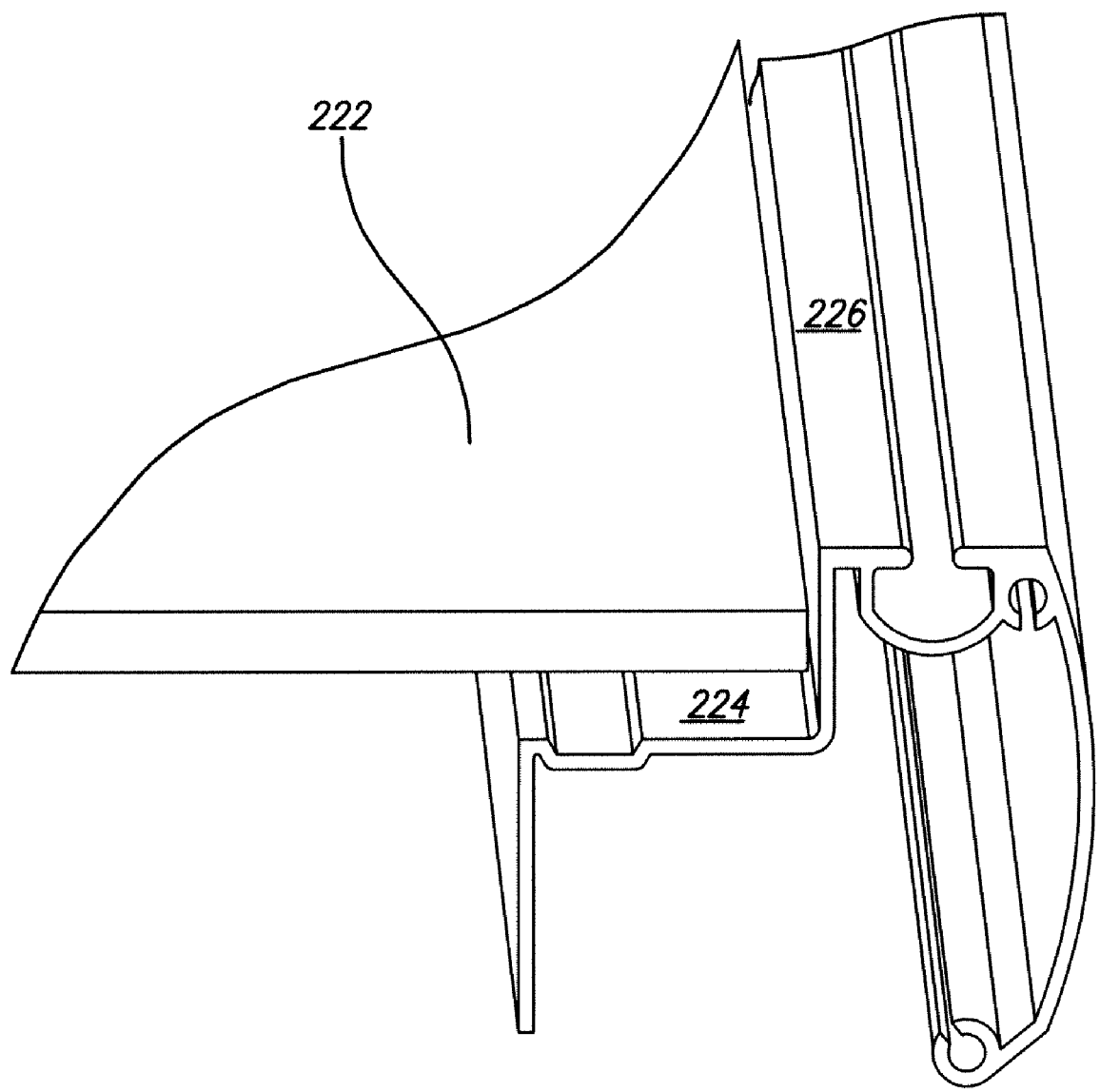
FIG. 16 shows a cladding panel member in place on a vertical structural beam member used on a side edge.
Figure 17:
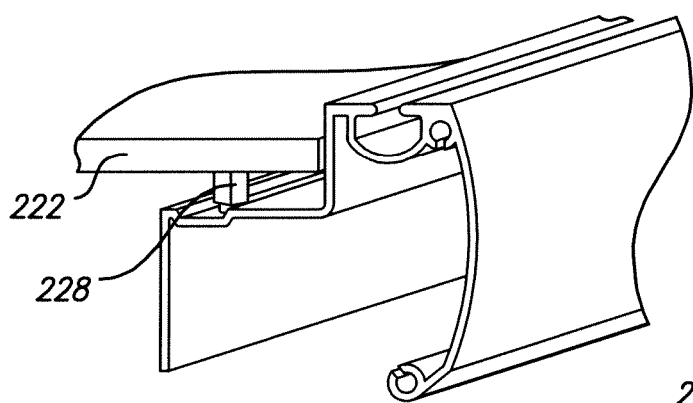
FIG. 17 is an end view of the structure of FIG. 16.
Figure 18:
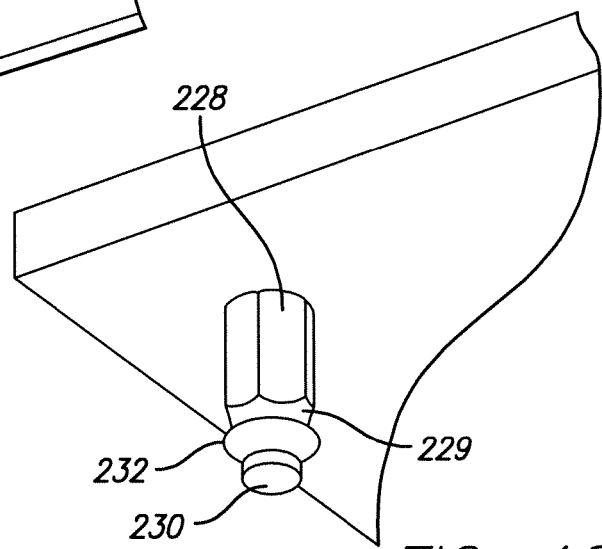
FIG. 18 illustrates one embodiment of the connector for mounting the cladding panels on the frame.
Figure 18A:
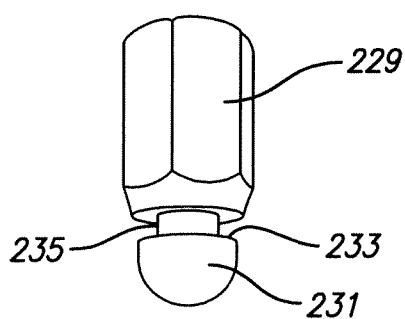
FIG. 18A illustrates an alternative embodiment of the connector.
Figure 19:
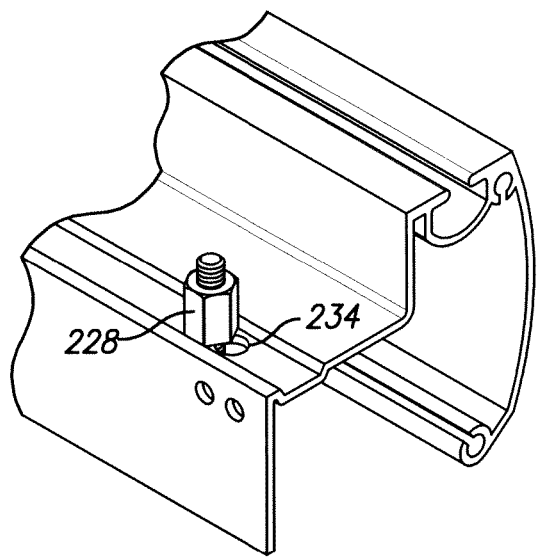
FIG. 19 illustrates the cladding panel connector device in position on an edge vertical structural beam member.

Referring now more particularly to FIGS. 16 through 19, the manner in which the cladding panels are detachably secured to the structural beam members, both vertical and horizontal, is illustrated and will be described. As is shown in FIG. 16, the cladding panel 222 is secured to the base 224 of an edge or peripheral structural beam member 226. As is shown in FIGS. 17, 18 and 19, the attachment is provided by a stud 228 which is secured to the panel 222 as by threads or the like. The distal end of each stud has a trapping member formed thereon. The trapping member is adapted to engage a complimentary receiving member formed on the vertical structure beams of the frame. The trappings member may take many forms and preferably has a flat surface that will rest against the structural beam to positionally support the cladding panel in position. One form of the trapping member is shown in FIG. 18 which illustrates a downwardly extending reduced diameter portion 230 having an outwardly extending flange 232 thereon. The end 230 along with the flange 232 is inserted into the wide opening of the keyhole slot 234 as shown in FIG. 19. The stud 228 as affixed to the panel 222 is then moved from the large portion of the keyhole opening to the smaller portion thereof to secure the panel in place. The space 229 receives the vertical structural beam. When it is desired to remove the cladding panel, the reverse operation is performed, thus allowing the panel to be removably attached to the structural beam members of the frame. A preferred embodiment of the panel attaching stud is illustrated in FIG. 18A. As is therein shown, the stud 229 is formed at its distal end with a terminating ball 231. The ball 231 is provided with a flat surface 233 facing the cladding panel. This structure facilitates the attachment and removal of the cladding panels. Although the flange 232 as above described works well it has been found that precise alignment of all four studs with the key hole slots is required to attach the cladding panel. With the ball and flat structure of FIG. 18A the ball allows the stud to be received in the slot even though there is some misalignment during the attachment process. The space 235 receives the beam. Although a keyhole slot is shown and described in FIGS. 16 through 19, it should be understood that other means of attaching the cladding panels to the frame can be utilized. For example, a ball and socket joint may be provided with a ball appearing on the end of the stud 228 and the socket mounted on the structural beam member of the frame to receive the ball in a detachable arrangement. It would be recognized particularly by reference to FIG. 17 that when the panel 222 is secured to the structural beam members of the frame, there is provided a substantial amount of space between the edge and back of the panel and the structural member to allow easy and ready passage of any tubes, wires or cables into the space between the mounting structure 10 and the wall. This space allows good ventilation to provide dissipation of heat generated by electrical or electronic components. If desired, a fan or similar device may be used to provide additional air flow through the space.

Figure 20:
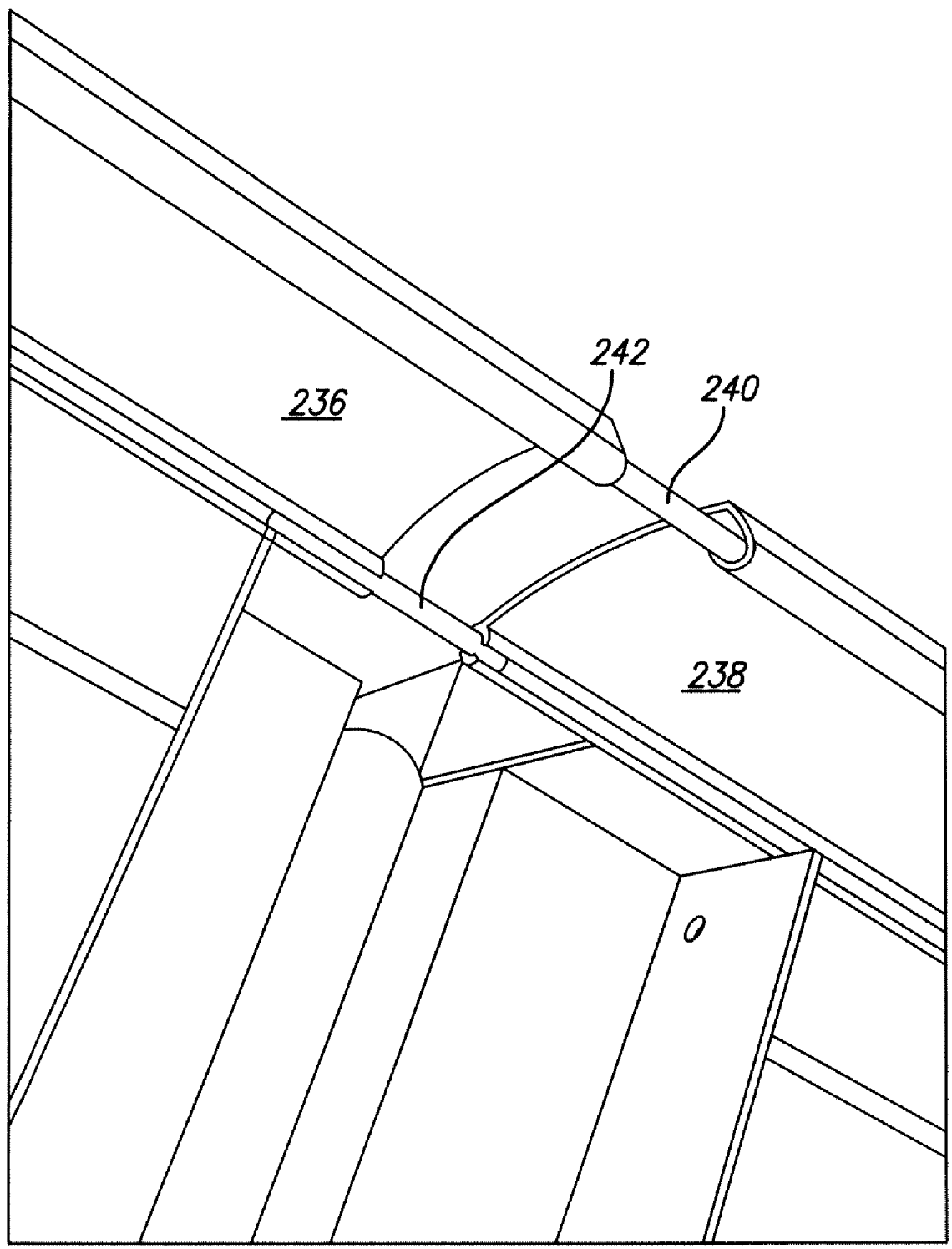
FIG. 20 illustrates the manner in which horizontal edge members of the frame structure are connected together.
Figure 21:
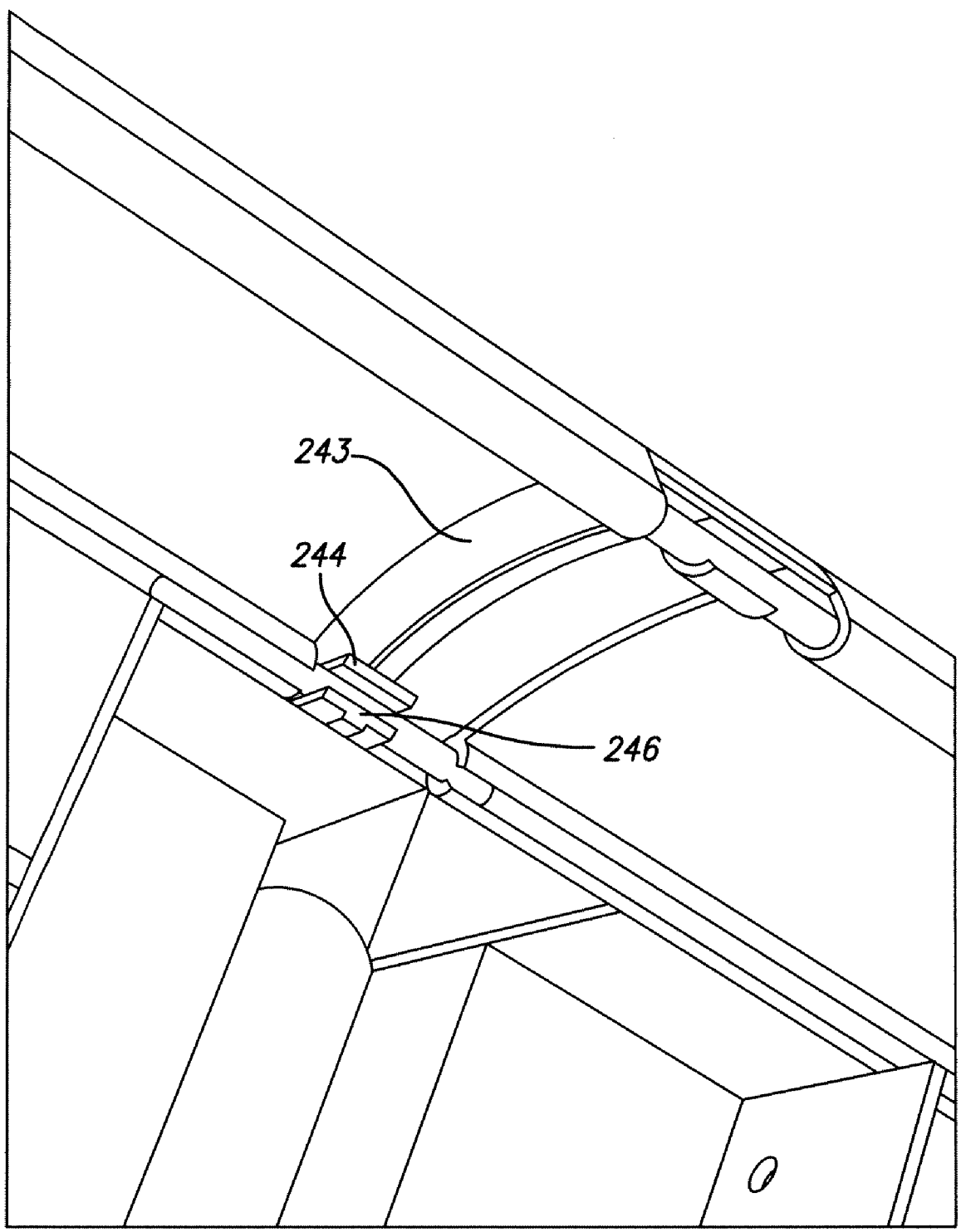
FIG. 21 illustrates a cover member for the space between adjacent sections of the structure as shown in FIG. 22 taken from the inside thereof
Figure 22:
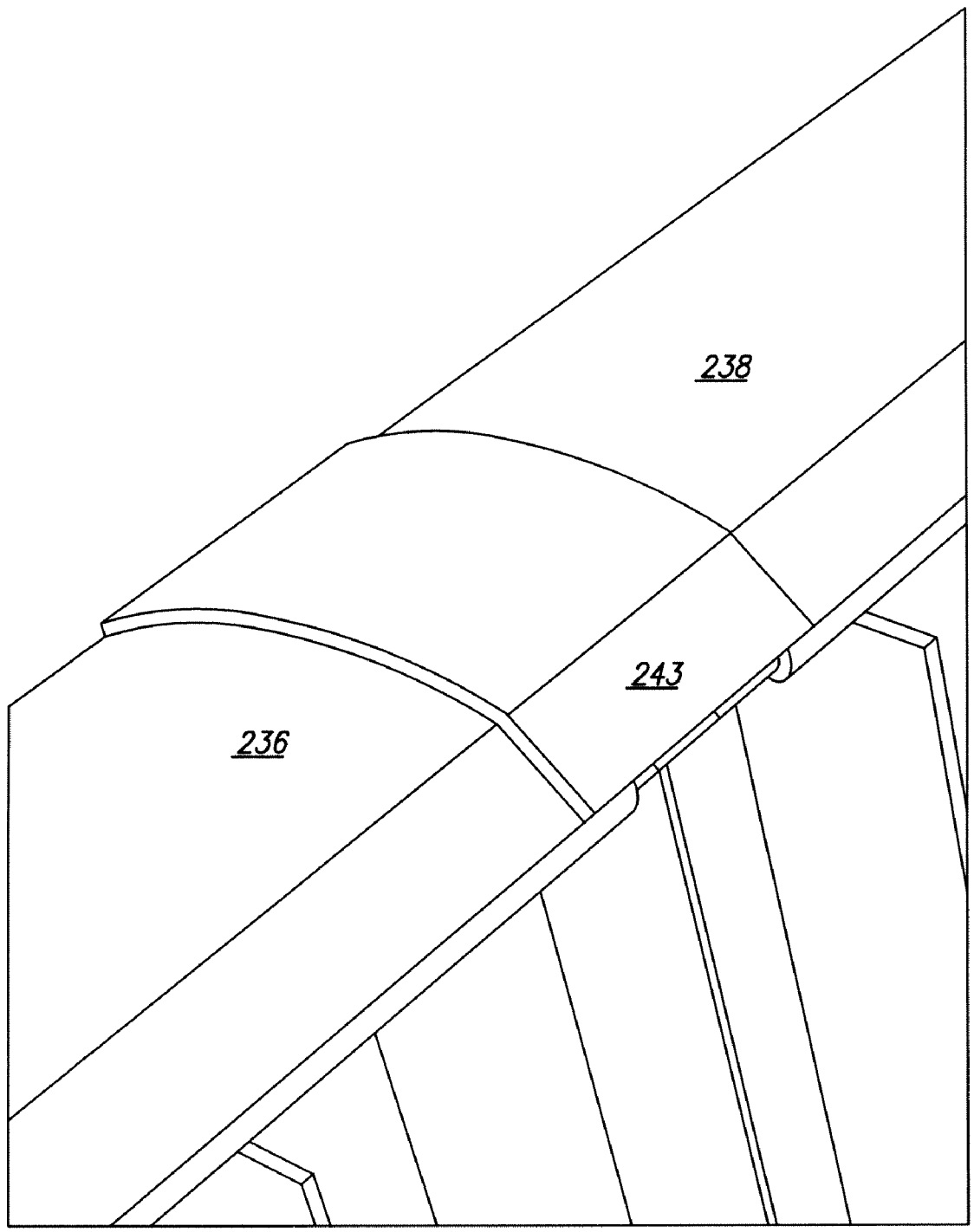
FIG. 22 is illustrative of the external appearance of the structure as shown in FIG. 21.

Referring now more particularly to FIGS. 20 and 21, there is illustrated the manner in which the peripheral portions of the upper and lower sections 18 and 20 (FIG. 2) are assembled. As is therein shown, adjacent incremental components 236 and 238 are joined by connectors 240 and 242. Obviously, this leaves a space between the ends of the components 236 and 238. That space is covered by a molded plastic cap which is snapped in place by inserting the fingers 244 and 246 over the connectors 240, 242 and thus, easily secures the cap 243 in place. FIG. 22 illustrates the cap 243 which has been snapped in place and now readily covers the space between the adjacent members 236 and 238.

Figure 23:
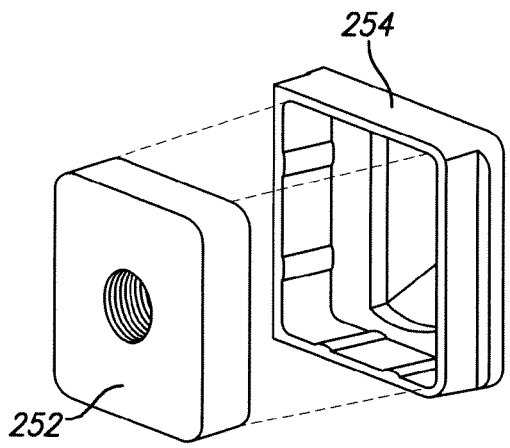
FIG. 23 illustrates a nut and holder member adapted for utilization with a structure of the type disclosed herein.
Figure 24:
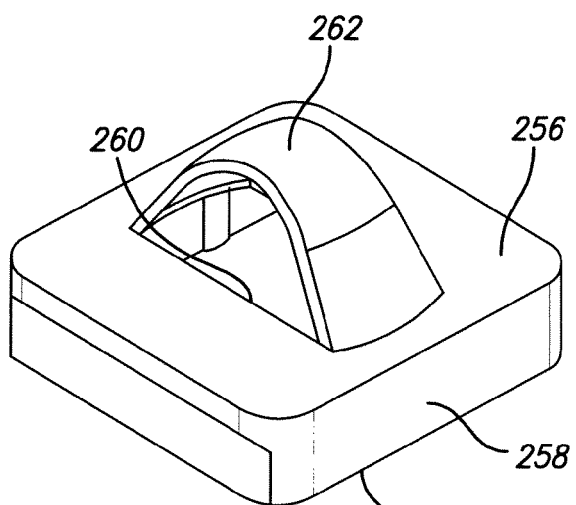
FIG. 24 is a perspective view of the holder as is shown in FIG. 23.
Figure 25:
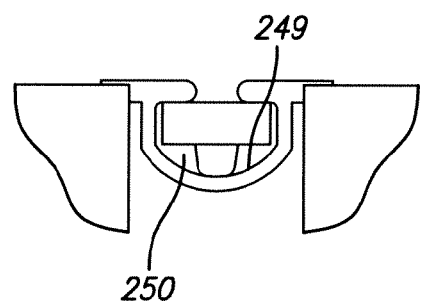
FIG. 25 is an end view of a center member showing the nut and holder in place therein.
Figure 26:
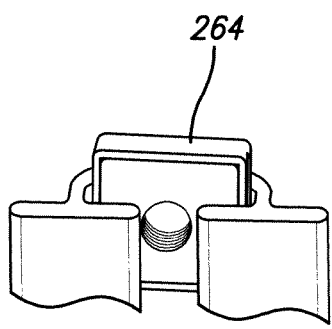
FIG. 26 shows the nut and holder being inserted in place.
Figure 27:
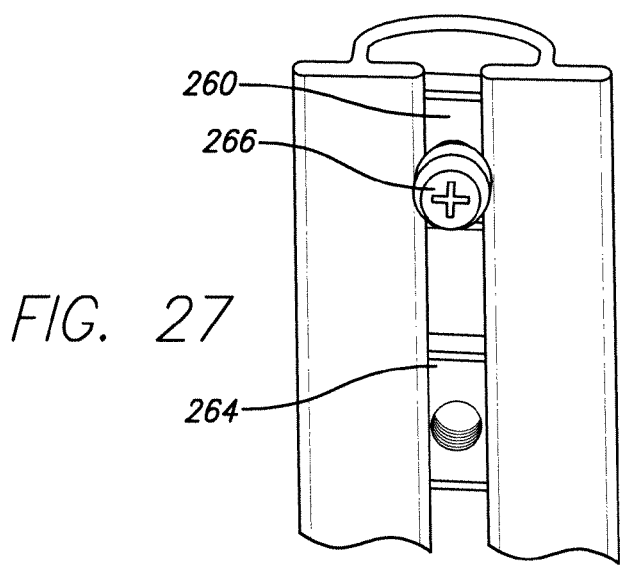
FIG. 27 illustrates a nut and holder in place and such a structure with a bolt inserted into the nut.

Referring now more particularly to FIGS. 23 through 27, there is illustrated a fastener means which is positioned in the channels formed in the vertically disposed center or intermediate beam members, as well as the vertical peripheral structural beam members. A channel as formed and as above described is again illustrated in greater detail at 250 in FIG. 25. The threaded nut and nut holder is illustrated in FIG. 23 with the threaded nut shown at 252 and the nut holder at 254. The nut holder is shown in greater detail in FIG. 24 and includes a square body having a base 256 with a continuous skirt 258 extending peripherally orthogonally there from and forming a cavity within which said nut is received. The skirt 258 is formed such that there is an interference fit between the skirt and the nut to secure the nut within the nut holder. The holder is constructed preferably of molded plastic but may be formed from sheet metal. An opening 260 is provided substantially at the central portion of the base 256. The nut holder further includes a friction enhancing member in the form of an arched ribbon 262 which bridges the opening 260 and extends in a direction opposite the skirt from the base 256. The distance between the bottom 264 of the skirt 252 and the peak of the ribbon 262 is substantially the same as the distance between the fingers forming the channel and the bottom or base 249 of the channel 250 as shown in FIG. 25. The ribbon 262 is preferably resilient. Thus, the combination of the threaded nut and nut holder may be inserted into the channel 250 and provides a slight frictional engagement to be able to position and hold the nut and nut holder at the desired position within the channel so that a mounting apparatus such as the shelf or a flat panel display mount for the flat panel TV 32 (FIG. 1) may be appropriately positioned. Such is further illustrated in FIGS. 26 and 27 which shows the combination of the nut and nut holder 264 partially inserted into the channel. In FIG. 27 there is illustrated the combination 264 at a position downwardly from the top of the member and an additional combination 264 which has a bolt secured therein as shown at 266. As will be understood by those skilled in the art, one may position the combination of the threaded nut and nut holder by partially inserting a bolt such as 266 into the threaded nut, then inserting the combination 264 of the nut and nut holder into the channel and then by grasping the end of the bolt 266, the combination may be positioned at any desired point on the frame assembly to receive the mounting structure such as the shelf or the flat panel display mount. After the mounting apparatus for the particular component desired is properly positioned upon the wall mounted frame structure, the fastener such as the bolt 266 or other fastener provided with the mounting structure is then firmly secured in place. It will be recognized by those skilled in the art that access to the channel after installation of the wall mounted frame structure may be had by removing the cap 243 (FIG. 22). Alternatively, a notch may be formed in the cap. This allows installation of components on the structure without removing it from the wall. It will thus be recognized that through the utilization of the multiplicity of frame beam structures having the channels formed therein that an infinite number of positions is provided on the wall mounted frame structure to permit mounting of any appliances, home entertainment equipment or other such devices as may be desired for a particular application.

There has thus been illustrated and described a wall mountable frame structure for mounting various devices, including home entertainment equipment or other similar devices which provides a visually pleasing profile because the point of contact of the periphery of the device is not visual because of the profile shape that is hiding any gaps that may occur as a result of uneven wall structures. There is also provided a substantial space between the wall and frame to permit the passage of tubes, wires, or cables and the like connected to equipment and also permits the utilization of standard electrical wiring plugs. Clearance is provided between the cladding panels and frame (approximately ½ inch) to allow tubes, wires and cables to be easily passed therethrough. The frame structure is adjustably mounted on support brackets affixed to the wall and after the frame structure has been appropriately positioned as desired the frame structure is tightened to the support brackets to prevent movement of the frame structure thereafter. While various embodiments and structures of the present invention have been illustrated and described, it is to be recognized that the scope of the present invention is determined by the claims set forth below:

What is claimed is:

1. A frame structure attachable to a wall for supporting one or more pieces of equipment comprising:
   a peripheral structural member having first and second horizontal beams and first and second vertical beams;
   at least one intermediate vertical beam structural member extending between and secured to said first and second horizontal beams;
      means for removably attaching at least one cladding panel to one of said vertical beam structural members and defining a space between said at least one cladding panel and said wall; and
   means for securing said frame structure to said wall, comprising:
      at least one transverse mounting member extending between the first and second vertical beams; and
      at least one support bracket having at least one mounting fork, the support bracket adapted to be secured to the wall and the at least one mounting fork adapted to receive the transverse mounting member.

2. The frame structure as defined in claim 1,
   further comprising a plurality of support brackets; each support bracket comprising a plurality of be pivotally secured mounting forks;
   wherein said mounting fork each define a slot, and further comprising a fastener extending through said slot and the fastener adapted to be threadably received by said support brackets whereby said mounting forks are rotatably movable between first and second positions, said first position moving said frame structure away from said wall and said second position moving said frame structure against said wall, said fastener being adapted to be securable to prevent movement of said mounting forks from said second position.

3. The frame structure as defined in claim 2 wherein said plurality of support brackets define an arcuate recess therein adjacent said mounting forks, said transverse mounting member being received within said arcuate recess when said mounting forks are in said second position, said mounting forks including a finger extending beyond said transverse mounting member to prevent said frame structure from being removed from said support brackets when said mounting forks are in said second position.

4. The frame structure as defined in claim 1,
   wherein at least one of said vertical beam structural members comprises a channel extending there along;
   wherein said frame structure further comprises a fastener movably disposed within said channel.

5. The frame structure as defined in claim 4, wherein at least one of said vertical beam structural members comprises a channel extending there along;
   wherein said fastener includes a threaded nut and nut holder within which said nut is secured and a threaded bolt received within said threaded nut, said nut and nut holder frictionally engaging walls defining said channel.

6. The frame structure as defined in claim 5 wherein said nut holder is formed of molded plastic material.

7. The frame structure as defined in claim 6 wherein said nut holder comprises a base, a continuous skirt extending orthogonally from a periphery of said base and forming a cavity within which said nut is received.

8. The frame structure as defined in claim 7 wherein said skirt is formed such that an interference fit exists between said skirt and said nut to secure said nut within said nut holder.

9. The frame structure as defined in claim 8,
wherein at least one of said vertical beam structural members comprises a channel extending there along;
wherein said channel is formed by inwardly directed spaced apart fingers and includes a base surface, said nut holder, when disposed in said channel engages said fingers and said base surface.

10. The frame structure as defined in claim 9,
wherein at least one of said vertical beam structural members comprises a channel extending there along;
wherein said nut holder further includes a friction enhancing member extending from said base in a direction opposite said skirt to engage said base surface of said channel.

11. The frame structure as defined in claim 10 wherein said friction enhancing member is a ribbon like member arching over an opening centrally formed in said nut holder base.

12. The frame structure as defined in claim 1 wherein said peripheral structural member comprises a base member having first and second edges, a straight arm extending from said first edge, and a curved arm extending from said second edge, said curved arm forming the periphery of the peripheral structural member of said frame.

13. The frame structure as defined in claim 12 wherein said curved arm includes an inwardly slanted terminal position.

14. The frame structure as defined in claim 12,
wherein at least one of said vertical beam structural members comprises a channel extending there along;
wherein said base member on said first and second vertical beams of said peripheral structural member each define a channel formed by a pair of inwardly directed spaced apart fingers and a base surface.

15. The frame structure as defined in claim 1,
wherein said means for attaching said cladding panels comprises a plurality of studs affixed to each said panel, each stud having a distal trapping end member for engaging complimentary receiving members on said vertical beam structural members;
wherein said trapping end member is a ball formed with a flat surface facing said cladding panel.

16. The frame structure as defined in claim 1,
wherein said means for attaching said cladding panels comprises a plurality of studs affixed to each said panel, each stud having a distal trapping end member for engaging complimentary receiving members on said vertical beam structural members;
wherein said trapping end member is an outwardly extending flange.

17. The frame structure as defined in claim 16 wherein said complimentary receiving member is a key hole slot defined by said beam.

18. A frame structure attachable to a wall for supporting one or more pieces of equipment comprising:
a peripheral structural member having first and second horizontal beams and first and second vertical beams;
at least one intermediate vertical beam structural member extending between and secured to said first and second horizontal beams;
at least one of said vertical beam structural members including a channel extending there along;
a plurality of cladding panels;
means for removably attaching at least one said cladding panels to one of said vertical beam structural members and defining a space between said cladding panel and said wall; and
wherein said means for securing said frame structure comprises: a plurality of support brackets, each support bracket including a plurality of pivotally secured mounting forks, and a plurality of transverse mounting members extending horizontally between said first and second vertical beams, said transverse mounting members adapted to be received by said mounting forks.

19. A frame structure attachable to a wall for supporting one or more pieces of equipment comprising:
a peripheral structural member having first and second horizontal beams and first and second vertical beams;
at least one intermediate vertical beam structural member extending between and secured to said first and second horizontal beams;
at least one of said vertical beam structural members including a channel extending there along;
a plurality of cladding panels;
means for removably attaching said cladding panels to said vertical beam structural members and defining a space between said cladding panels and said wall;
means for securing said frame structure to said wall comprising a plurality of support brackets, each support bracket comprising a plurality of pivotally secured mounting forks.

20. The frame structure as defined in claim 19,
wherein said means for attaching said cladding panels comprises a plurality of studs affixed to each said panel, each stud having a distal trapping end member for engaging complimentary receiving members on said vertical beam structural members.

21. The frame structure as defined in claim 19, further comprising a plurality of transverse mounting members extending horizontally between said first and second vertical beams, said transverse mounting members being received by said mounting forks.

22. The frame structure as defined in claim 21, wherein said mounting forks each define a slot, a fastener extending through said slot and the fastener being threadably received by said support bracket whereby said mounting fork is rotatably movable between first and second positions, said first position moving said frame structure away from said wall and said second position moving said frame structure against said wall, said fastener being securable to prevent movement of said mounting fork from said second position.

* * * * *